Dec. 20, 1960 S. ALAFOUZOS 2,964,978
MACHINING APPARATUS
Filed Dec. 10, 1956 5 Sheets-Sheet 1

INVENTOR.
STAVROS ALAFOUZOS
BY
Cushman, Darby & Cushman
ATTORNEYS.

Dec. 20, 1960   S. ALAFOUZOS   2,964,978
MACHINING APPARATUS
Filed Dec. 10, 1956   5 Sheets-Sheet 3

INVENTOR.
STAVROS ALAFOUZOS
BY
Cushman, Darby & Cushman
ATTORNEYS.

Dec. 20, 1960 S. ALAFOUZOS 2,964,978
MACHINING APPARATUS
Filed Dec. 10, 1956 5 Sheets-Sheet 5

INVENTOR.
STAVROS ALAFOUZOS
BY
Cushman, Darby & Cushman
ATTORNEYS.

United States Patent Office 2,964,978
Patented Dec. 20, 1960

2,964,978

MACHINING APPARATUS

Stavros Alafouzos, 40—45 Elberston St., Elmhurst, N.Y.

Filed Dec. 10, 1956, Ser. No. 627,345

7 Claims. (Cl. 77—2)

The present invention relates generally to the metal cutting art and more specifically it relates to apparatus particularly adapted to be used in machining or remachining the crankshaft bearing surfaces of internal combustion engines and the like.

An important object of the invention is to provide a novel apparatus especially suitable for machining engine crankshaft bearings, including the cylindrical and radial bearing surfaces thereof.

Another important object of the invention is to provide a novel and conveniently handled device particularly adapted for correctly positioning and aligning a boring bar to be used for machining cylindrical crankshaft bearing surfaces. A related object is the provision of such a positioning device adapted to cooperate with reference surfaces of the engine for precisely and accurately aligning a boring bar for rotation on the axis of crankshaft rotation irrespective of irregularities or imperfections in the surfaces of any of the crankshaft bearings.

Still another object is to provide a positioning device of the type referred to above, adapted to be inexpensively constructed and conveniently adjusted for use with numerous types and sizes of engines.

A further object is to provide a novel method for accurately positioning and aligning a boring bar in the boring of engine crankshaft bearings.

It is a still further object to design a novel feeding means particularly adapted for effecting a variable axial feed of boring bars, or the like, used in machining engine crankshaft bearings.

It is also an object to provide a novel tool bit assembly for attachment to boring bars, facilitating predetermined and precise positioning of the cutting edge of the bit.

An additional object resides in the provision of improved engine-engageable supporting means for boring bars of the type under consideration.

Yet another object resides in the provision of novel structure for machining the radial or thrust bearing surfaces of engines. Related objects are the provision of an improved cutting tool for radial or thrust bearing surfaces and a positioning device therefor, of relatively inexpensive construction and simple to operate.

Further objects and advantages of the invention will be in part obvious and in part pointed out hereinafter.

The novel features of the invention may be best made clear from the following description and accompanying drawings in which.

Figures 1, 5:
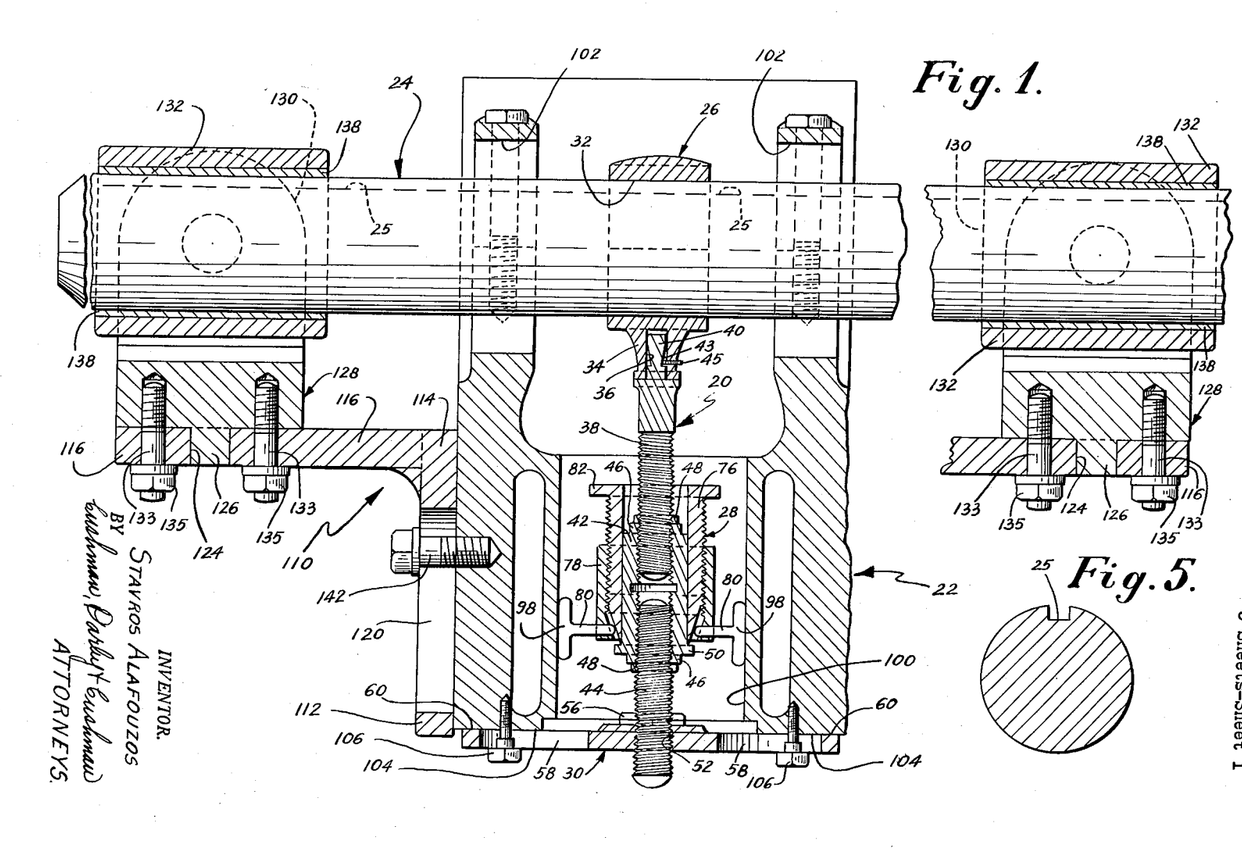
Figure 1 is a fragmentary, side elevational view, partly in vertical section, of an internal combustion engine and a preferred form of the apparatus of the invention for boring cylindrical crankshaft bearing surfaces.
Figure 5 is a vertical sectional view of the boring bar.

Referring now to the drawings, Figure 1 shows a boring bar positioning device 20 of the invention, attached to an internal combustion engine block 22 and engaging a boring bar 24. In the devices heretofore utilized for positioning boring bars in the original boring or reboring of engine crankshaft bearings, the cylindrical bearing surfaces themselves have usually been utilized as the reference surfaces. That is to say, the boring bar positioning devices have been constructed for engagement with one or more of the in-line bearing surfaces so that if such bearing surfaces were themselves irregular or not truly circular, the finished surfaces of the machined bearings might be non-circular or somewhat out of line with respect to the original or desired axis of crankshaft rotation. As should be evident, this has caused serious difficulties in the past, both in the machining or boring operations and in normal usage of the engine after the bearings have been bored or rebored.

Accordingly, an important feature of the positioning device 20 of the invention is its use independent of the bearing surfaces themselves as reference surfaces. In a preferred embodiment of the invention (Figures 1, 2 and 3), the positioning device 20 is constructed with a boring bar engageable portion 26, an engine cylinder engageable portion 28, and a flat engine surface engageable portion 30. These portions preferably are operatively interconnected for adjustment of the distance between portions 26 and 30 making the device 20 adaptable to engines of various types and sizes, as will be apparent from the description to follow.

Figure 3:
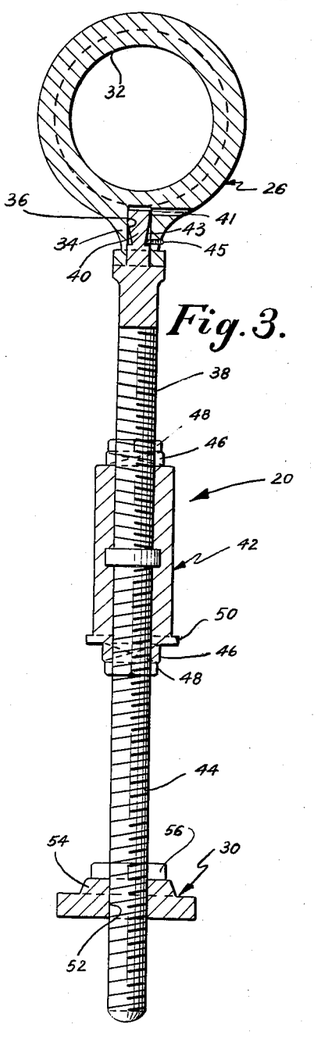
Figure 3 is a vertical sectional view of the device of Figure 2 with certain parts thereof removed.

The boring bar engageable portion 26, hereinafter referred to as the first portion of the positioning device, preferably is in the form of a metallic ring or sleeve having an inner bore 32 substantially equal in diameter to the diameter of boring bar 24, and having a depending radial boss 34 provided with a blind vertical hole 36 therein. A threaded rod 38 is formed with a pin-like upper end 40 adapted to be inserted in the blind hole 36, the latter communicating with a radial vent hole 41, if desired, to facilitate insertion of pin 40 into hole 36. It should be noted that the hole 36 and the pin 40 on the upper end of rod 38 are so constructed and arranged that when assembled, as seen in Figure 3, the axis of rod 38 will intersect the axis of bore 32 at a right angle. Moreover, the pin 40 of rod 38 preferably is formed with an inwardly and downwardly tapering surface 43 intermediate its height and a set screw 45 preferably is threaded through the boss 34 into loose engagement with the bottom of this tapering surface 43. By virtue of this construction, any tendency on the part of the first portion 26 to move relatively vertically away from the pin 40 will be prevented by the wedging of the set screw against the tapering surface 43. Rod 38 preferably is provided with left-hand threads throughout a substantial part of its length, and at its lower end is screwed into the upper end of a turnbuckle 42. Turnbuckle 42 preferably is circular in transverse section and at its lower end is screwed on to the upper end of right-hand threaded rod 44, the latter rod being coaxial with rod 38 and threadedly engaged to the portion 30, hereinafter referred to as the second portion.

As best seen in Figure 3, the upper and lower ends of turnbuckle 42 are provided with axially extending collars 46 against which lock nuts 48 may be tightened to retain rods 38, 44 in desired axial positions relative to the turnbuckle. If desired, a disc or other stop means may be positioned in the center of the turnbuckle, between the ends of the rods therein, for limiting inward movement of said rods. A radially projecting, annular flange 50 preferably is formed at the lower end of turnbuckle 42 for a purpose set forth hereinbelow.

Figure 2:
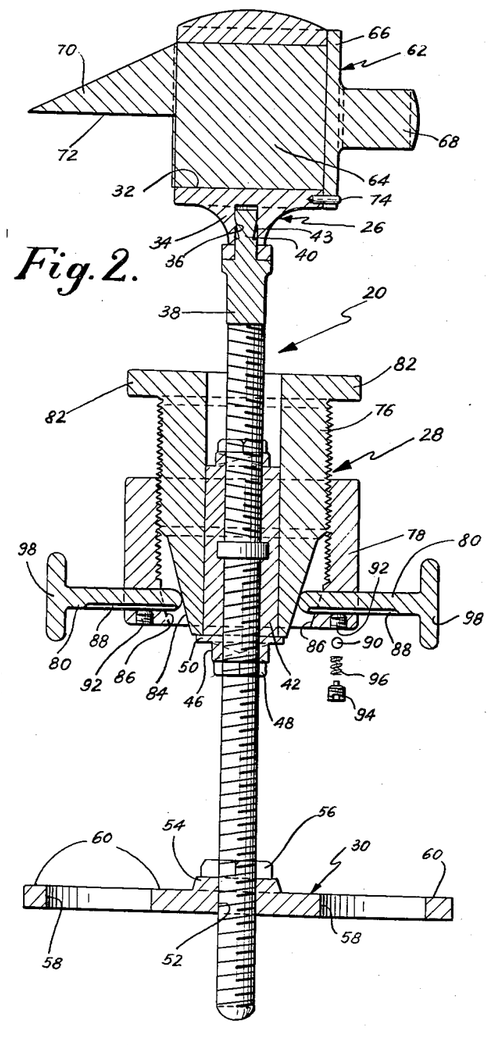
Figure 2 is an enlarged vertical sectional view of an embodiment of the boring bar positioning device of the invention.

Second portion 30 preferably is a narrow metallic plate formed with a central, threaded hole 52 for the rod 44, and extending through an upper central boss 54 against which a lock nut 56 may be tightened. Longitudinal slots 58 are formed in second portion 30, on either side of its midpoint and equally spaced therefrom extending throughout the height of the plate. The various parts of the positioning device 20, shown in Figure 3, are so constructed and arranged that the upper surface 60 of second portion 30 is substantially perfectly flat and disposed in a plane perpendicular to the axis of rods 38, 44 and parallel to the axis of bore 32 of first portion 26. In this connection, an insert or plug 62 is removably fitted in bore 32 (Figure 2). Insert 62 preferably has a solid circular body 64 frictionally engageable with first portion bore 32, and terminating in a stop shoulder or radial flange 66 and finger engageable knob 68 at one end and a projecting, upper part 70 at the opposite end thereof. Projection 70 is formed with a substantially perfectly flat undersurface 72, disposed opposite to and facing the flat surface 60 of second portion 30, and defining a plane containing the axis of bore 32. Suitable means are employed for preventing relative rotary movement between insert 62 and first portion 26 so that the surface 72 will be positively retained in opposed parallel relationship to surface 60. Such means may include a lock pin 74 extending through aligned holes in shoulder 66 and first portion 26 (Figure 2).

By virtue of the previously described structure of positioning device 20, it will be seen that opposed surfaces 60, 72 define a distance therebetween which may be readily measured by a precision instrument, such as a so-called "inside micrometer" or "inside calipers" (neither of which is shown). In any event, this distance may be readily preset by any convenient procedure, as by holding first portion 26 or second portion 30 and its associated rod stationary, loosening the adjacent lock nut 48, and rotating the turnbuckle 42 in the desired direction to move surfaces 60, 72 away from or toward each other, after which the loosened nut 48 is again tightened to retain the parts in adjusted position. The position of Figure 3 indicates the minimum separation between these surfaces, however, as will be understood, the size of turnbuckle 42 and related parts may be varied to permit adjustment of the distance between surfaces 60, 72 over any desired range or ranges of dimensions for adapting the device 20 for use with various sizes of engines.

The engine cylinder engageable portion 28, hereinafter referred to as the third portion, is fitted over the turnbuckle 42 at any convenient stage of assembly of device 20, as before rod 38 is threaded into turnbuckle 42 or before first portion 26 is attached to this rod. Third portion 28 preferably comprises inner and outer members 76, 78 respectively, and a plurality of, such as four, radially reciprocable fingers 80. Inner member 76 is externally threaded throughout a substantial portion of its length and centrally bored to frictionally engage and embrace the outer surface or turnbuckle 42. A radial flange 82 is formed at upper end of member 76 which flange preferably is square or hexagonal shaped in transverse section for engagement and manipulation by a suitable tool or by hand.

The lower part of inner member 76 tapers or converges downwardly and inwardly, defining an inverted frusto-conical surface 84, the lower end of which abuts against the radial flange 50 of turnbuckle 42 to limit downward movement of third portion 28.

Outer member 78 preferably is tubular having internal threads for engagement with inner member 76, and each of the fingers 80 may be slidably disposed in a radial hole in outer member 78. An internal downwardly converging surface 86 extends from the bottom of the internal threads of outer member 78 to the bottom of said member, and is generally complementary to the tapering surface 84 of inner member 76.

It will be understood that upward axial closing or tightening movement of outer member 78 with respect to inner member 76 will effect an outward radial movement of fingers 80 as a result of the wedging action of surface 84, the latter acting as a cam surface engaging the inner ends of fingers 80 and wedging or driving them outwardly as surfaces 84, 86 approach each other.

Suitable structure is provided for retaining fingers 80 in their respective outer member radial holes. Such structure may include an outer longitudinal slot 88 formed in the lower surface of each finger 80 for reception of a spring urged ball detent 90 mounted in an appropriate hole 92, extending downwardly from each finger, by means of a screw 94 and spring 96, all as shown in Figure 2. Radial movement of each finger 80 will accordingly be limited by engagement of the inner and outer ends of slot 88 with its respective ball detent. The outer ends of fingers 80 may be formed with transverse heads 98, providing the fingers with a horizontal, general T-shape.

The use of positioning device 20 in the boring or reboring of engine crankshaft bearing bores will now be described, reference being made to Figure 1. The engine block 22 includes the usual cylinders 100 (only one being shown for convenience of illustration) and the in-line crankshaft bearings 102, and is mounted by suitable means (not shown) in the normal inverted position for boring, with the combustion chamber end of each of the cylinders 100 disposed lowermost and the head (not shown) of the engine removed. To correctly and accurately position the boring bar 24 for boring the bearings 102, the distance between the opposed surfaces 60, 72 of positioning device 20 is precisely set in the manner described above, to correspond exactly to the engine dimension for the distance between the lower flat surface 104 of the engine block 22, surrounding the combustion chamber end of cylinder 100, and the axis of crankshaft rotation, i.e., the axis of bearings 102. To obtain the necessary information regarding this engine dimension, reference may be made to the appropriate engine manual.

When this is completed, the insert 62 may be removed and the positioning device is inserted upright through cylinder 100, preferably one of the end cylinders, until the flat surface 60 of second portion 30 firmly contacts the flat bottom surface 104 of the engine block. The block 22 may be provided with tapped holes to receive bolts 106 inserted through the slots 58 in second portion 30. These bolts 106 preferably are not fully tightened at this time, while the head 82 of third portion 28 is rotated to drive the heads 98 of fingers 80 outwardly into firm frictional contact with the walls of cylinder 100 whereby the axis of each rod 38, 44 will coincide with the axis of the cylinder 100. It will be seen that since bolts 106 were not fully tightened, second portion 30 can move laterally while fingers 80 are brought into contact with the cylinder walls 100 of the engine. In this way, correct alignment of rods 38, 44 coaxially with the engine cylinder axis is permitted. At this time, the bolts 106 are fully tightened and due to the predetermined presetting of the distance between surfaces 60, 72 of the positioning device, the axis of the bore 32 of first portion 26 will be disposed at the same elevation above surface 104 of the engine block as the axis of bearings 102. Moreover, the axis of bore 32, being perpendicular to the axis of rods 38, 44 will also perpendicularly intersect the axis of engine cylinder 100.

It should be evident that the numerous adjustments of the distance between surfaces 60, 72 during use of positioning device 20 will result in a varying and uncertain angular disposition of the axis of bore 32 of first portion 26 with respect to the longitudinal axis of second portion 30. Thus, the use of only one positioning device 20 will not guarantee the required acuurate positioning of boring bar 24 coaxially with the bearings 102. In this connection, the invention contemplates the use of another or second positioning device 20 (not shown), identical to the one previously described, arranged in another cylinder 100 (not shown) preferably the end cylinder opposite cylinder 100 of Figure 1. The second positioning device 20 will be identically preset and arranged in its respective cylinder as the device 20 in Figure 1. In this manner, the boring bar 24 may now be inserted through the tubular first portion 26 of each positioning device 20, and be disposed precisely coaxially with respect to the axis of bearings 102. That is to say, since the axis of bore 32 of first portion 26 for each of the two positioning devices 20 will be disposed coaxially with the horizontal axis of bearings 102 or intersect this latter axis at a point directly on the vertical axis of its respective engine cylinder 100 (depending on the horizontal angular disposition of bore 32), the boring bar 24, when inserted through bores 32, will operate to align perfectly both the axis of bores 32 as well as its own axis with the axis of bearings 102, since the only possible direction the bar 24 could take to be inserted through both bores 32 would be that stated.

Hence, it is seen that the device 20 of the invention permits and greatly facilitates accurate and precise positioning of boring bar 24, irrespective of any surface irregularities or uneveness in bearings 102, for proper machining of these bearings by a cutting tool assembly and driving and feeding arrangement to be described hereinbelow.

After the boring bar 24 has been properly positioned by the devices 20, supporting means 110 are attached to each end of the engine to receive the now-positioned boring bar 24. These supporting means 110, more fully described hereinafter, retain the bar 24 in position during the boring operation, and the positioning devices 20 preferably are disengaged from bar 24 and the engine block 22 before boring begins. This may be done by completely withdrawing bar 24 from engagement with bores 32 and then removing the devices 20 from the engine by loosening the fingers 80 and bolts 106. If desired, the ring-like member of the first portion 26 may be split longitudinally and suitably hinged or otherwise connected together for disengagement from boring bar 24 without the necessity of entirely removing the positioning device 20 from the engine.

Although not preferred, the device 20 may be constructed so that the distance between surfaces 60, 72 is fixed and not adjustable whereby the device can only be used for engines of a certain size. In this embodiment, the angular relationship of the axes of first and second portions 26, 30 respectively, may also be fixed so that under some circumstances, only one positioning device 20 would be needed to properly align the boring bar 24, inasmuch as the axis of the bore 32 can then be prearranged to be disposed coaxially with respect to the axis of bearings 102.

Figures 4, 6, 7, 8:
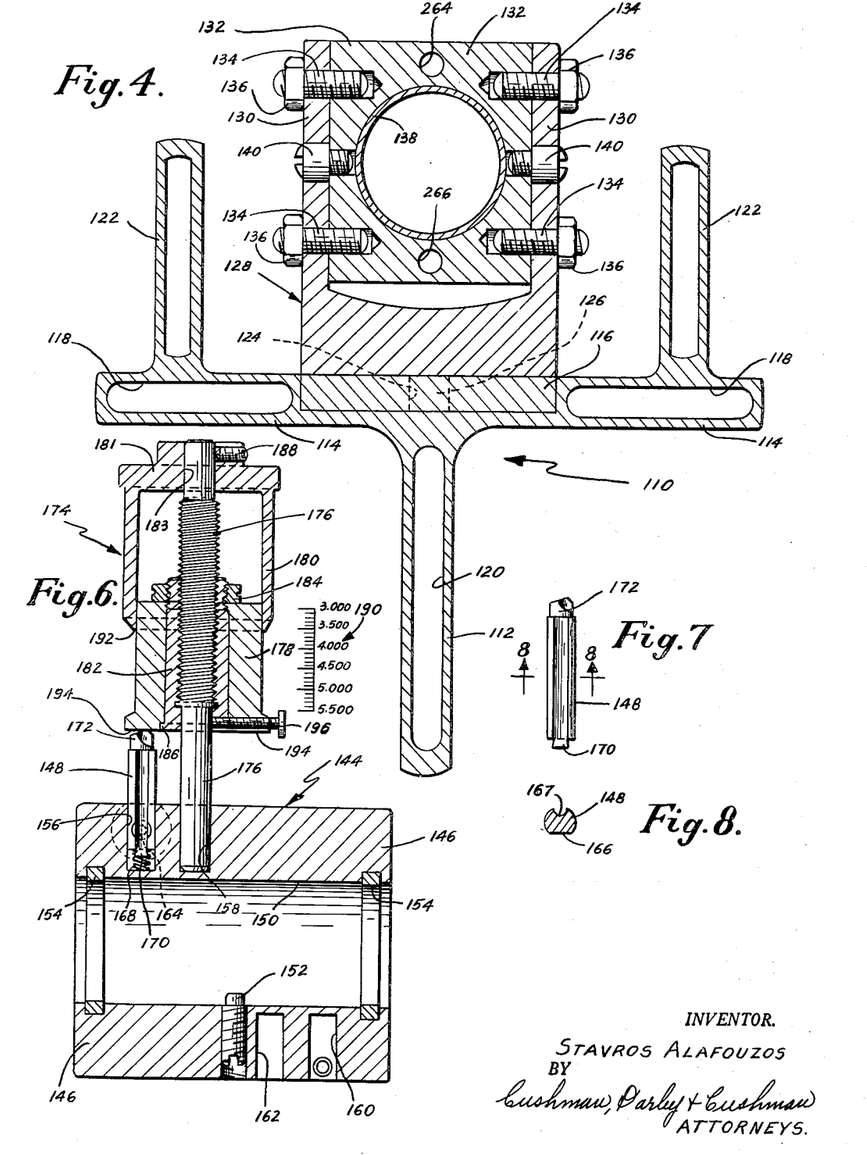
Figure 4 is an enlarged vertical sectional view of a preferred form of the boring bar supporting means.
Figure 6 is a vertical sectional view of a boring bar tool bit assembly and gauging means for positioning the tool bit thereon.
Figure 7 is a side elevational view of the tool bit in Figure 6.
Figure 8 is a horizontal sectional view taken along line 8—8 of Figure 7.

Referring again to the supporting means 110, a preferred embodiment of this structure is illustrated in Figures 1 and 4. It includes a T-shaped portion having a vertical stem 112 and a horizontal head or cross piece 114. A central platform 116 extends horizontally outwardly from the cross piece 114, while longitudinal slots 118 are provided in cross piece 114 on either side of this platform as seen in Figure 4. A longitudinal slot 120 is also provided in the stem 112. Longitudinally slotted vertical pieces 122 may be formed adjacent opposite ends of cross piece 114 and integral therewith, as shown in Figure 4.

A hole 124 is formed in platform 116, along the vertical center line of the supporting means 110, for reception of a depending lug 126 of a bearing block holder 128. Holder 128 includes a flat base resting on platform 116 and upstanding ears 130 at each side thereof defining with the base a receiving cavity for a bearing block 132. Studs 133 and nuts 135 (see Figure 1) may be employed for preventing rotation of holder 128 on platform 116. Bearing block 132 fits snugly between ears 130 and may be retained in position through studs 134 and nuts 136 (Figure 4). This block is centrally, horizontally bored and preferably is provided with a sleeve bearing 138 in such bore for embracing the boring bar 24. To properly position bearing block 132 in the holder 128, center screws 140 extend through ears 130 into block 132 whereby rotation of these screws in desired directions will align or rotate the block for desired engagement by studs 134.

As shown in Figure 1, supporting means 110 is secured to one end of the engine block 22 with the already-positioned boring bar 24 inserted through sleeve bearing 138. Another identical supporting means is secured to the opposite end of the engine block for supporting the opposite end of the boring bar 24. Bolts 142 preferably are used for securing the stem 112 and cross piece 114 to the vertical end wall of the engine block, being inserted through the slots 118, 120 and tightened in suitable holes provided in the engine block. In this connection, the slots 118, 120 in these parts of the supporting means permit some lateral and vertical adjustment of the position of the supporting means, while the bearing block 132 will also be permitted some adjusting movements through the journalling of depending lug 126 of holder 128 in the platform hole 124. It will be understood that these adjusting movements will be effected before the respective studs and bolts are tightened to positively position the bearing sleeve 138 of each supporting means 110 so that the boring bar 24 will be coaxial with the axis of bearings 102 after the positioning devices 20 are removed. Any suitable number of holes may be provided in platform 116 for the studs 133 to retain the holder 128 and block 132 in desired rotary position. The vertical pieces 122 may be useful for certain types of engines to provide additional securing support for the platform 116.

Considering now the preferred embodiment of the tool bit assembly for the boring bar 24, reference is made to Figure 6, wherein the assembly, indicated generally by numeral 144, is shown to include a sleeve 146, preferably cylindrical, and tool bit 148. Sleeve 146 has an inner bore 150 of approximately the same diameter as the boring bar 24 and may be provided with a radial set screw 152 adapted to extend into the bore 150 for driving disposition in a longitudinal groove 25 in the boring bar 24 (Figure 5). An O-ring seal or washer 154 may be provided at each end of sleeve 146 for frictionally embracing the boring bar.

Two blind radial holes 156, 158 extend inwardly from the outer surface of sleeve 146 adjacent one end thereof. These holes preferably are of equal depth. Similar holes 160, 162 are provided at the opposite end of sleeve 146, diametrically opposed to holes 156, 158.

The tool bit 148 is adapted to be adjustably positioned in hole 156 and retained therein by a set screw or the like (not shown) screwed into a hole 164 preferably disposed perpendicularly to hole 156. As seen in Figure 8, the shank of tool bit 148 preferably is provided with a flat, longitudinal surface 166 and a longitudinal groove 167, against either of which surfaces the set screw in hole 164 may be tightened. A biasing spring 168 may be arranged in the bottom of hole 156 abutting the bottom of the tool bit and encircling a projection 170 at the bottom thereof.

For precisely positioning the tool bit cutting edge 172, a gauge 174 (Figure 6) preferably is provided including a gauge rod 176 having a free projecting end adapted to be inserted in hole 158 of the sleeve 146. Gauge 174 preferably includes tubularly cylindrical inner 178 and outer 180 telescoping members. An insert collar 182 is fitted and retained in stationary position within the inner member 178 as by threaded engagement with lock nut 184 tightened against the top of inner member 178 and cooperating with a bottom radial flange 186 on the collar disposed in a complementarily shaped recess in the inner member.

Collar 182 is axially bored and provided with internal threads throughout a substantial portion of its bore for threaded connection to the external threads on the gauge rod 176. The upper end of rod 176 is drivingly connected to the web 181 of the cup-shaped outer member 180, as by insertion in a hole 183 in said web and frictional engagement to a set screw 188. Thus, it will be apparent that rotation of outer member 180 will be transmitted to rod 176 to effect an axial projection or retraction thereof by reason of its threaded engagement with collar 182. A suitable graduated scale 190 (illustrated in elevation on the right side of gauge 174 in Figure 6) may be arranged on the outer surface of inner member 178 for cooperation with the lower end 192 of outer member 180 to indicate the projected distance of rod 176 with respect to the flat radial surface 194 of inner member 178. A radial set screw 196 may be positioned in the bottom of inner member 178 for retaining the rod 176 in predetermined adjusted position.

In using gauge 174, the equal depths of hole 156, 158 will be known and the projected distance of rod 176 with respect to surface 194 will be set to be equal to the desired radial projection of tool bit cutting edge 172 with respect to the outer cylindrical surface of sleeve 146 plus the depth of the hole 156. In other words, the rod 176 will be preset so that when it is inserted in hole 158, the radial distance between surface 194 and the cylindrical surface of sleeve 146 (along the axis of hole 156) will be equal to the desired projection of tool bit edge 172, the latter being urged into contact with surface 194 by spring 168. It will be appreciated that a similar tool bit may be similarly arranged and positioned in hole 160 of sleeve 146, or in any other similar holes (not shown) in the sleeve.

After the gauge 174 is so used to properly position the tool bit 148, the latter is retained in this position by tightening its set screw and the gauge is then removed from the sleeve 146. The tool bit assembly 144 is now ready for attachment to the boring bar 24. Mounting of assembly 144 may be readily accomplished by fitting sleeve 146 over the boring bar, as, for example, after positioning devices 20 have been removed and before the bar 24 is mounted in the second supporting means 110 but after the bar has been mounted in the first supporting means 110. Sleeve 146 is secured in desired position by tightening screw 152 into the groove 25 of the boring bar. As will be understood, any number of tool bit assemblies 144 may be similarly arranged on the bar 24 so that all or any desired number of engine bearings 102 may be bored simultaneously or in any convenient sequence.

Any suitable power source for driving the boring bar may be utilized, such as a conventional electric motor (not shown). A pulley assembly 200 (Figure 15) preferably is provided for transmitting power to the bar 24 and includes a hub 202 adapted to be fitted over the bar 24 and through which a radial set screw 204 extends for loose disposition in the longitudinal groove 25 of the boring bar, whereby relative axial movement of bar 24 with respect to pulley assembly 200 will be permitted while the assembly 200 transmits rotary power to the boring bar. Pulley assembly 200 preferably is positioned on the boring bar outside of and adjacent to one of the supporting means 110, and includes a plurality of pulleys 206, 208 extending radially outwardly from hub 202 and having outwardly diverging annular flanges at their outer ends defining V-shaped annular grooves 210, 212 respectively, for the reception of a conventional power transmitting V-belt (not shown) drivingly associated with the power source. The diameters of pulleys 206, 208 are different permitting variable working or operating r.p.m.'s for the boring bar depending on the pulley to which the V-belt is connected. It will be obvious that pulleys of other sizes may be provided for increasing the number of selectable working r.p.m.'s for the boring bar.

Figures 9, 9A, 11, 12, 13, 14:
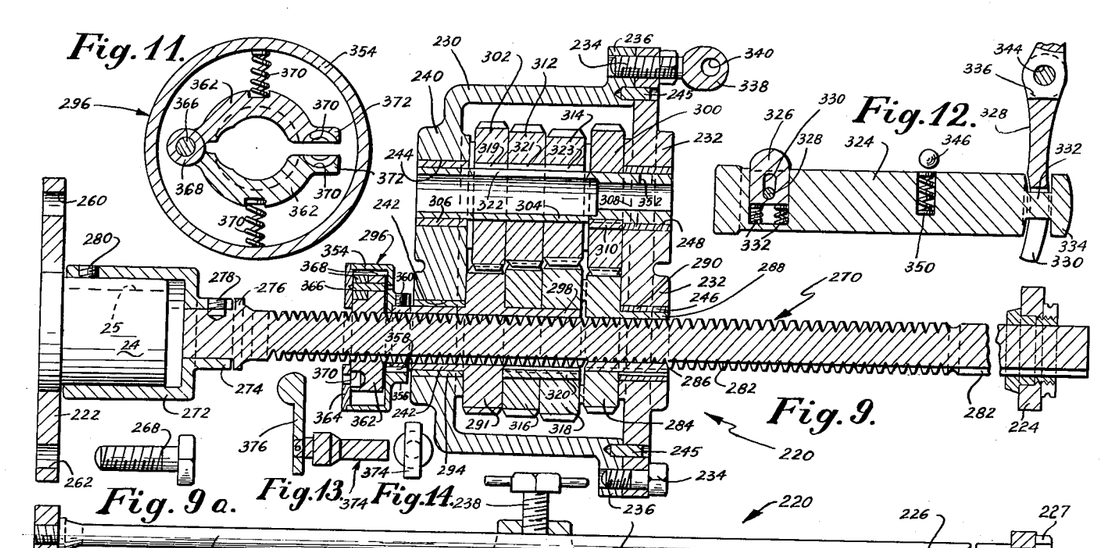
Figure 9 is a vertical sectional view of a preferred form of axial feeding mechanism for the boring bar.
Figure 9a is a side elevational view of a bolt for use with the device of Figure 9.
Figure 11 is an enlarged vertical sectional view of one of the parts of the mechanism of Figure 9.
Figure 12 is a vertical sectional view of a structure adapted to be connected to the mechanism of Figure 9 and on an enlarged scale.
Figure 13 is an enlarged vertical sectional view of a device adapted to be used with the mechanism of Figure 11.
Figure 14 is an end elevational view of the device of Figure 13.
Figure 10:
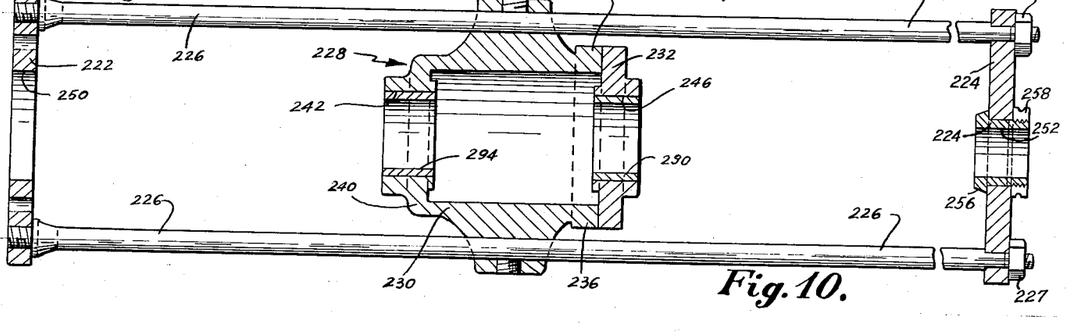
Figure 10 is a horizontal sectional view of the mechanism of Figure 9 with certain of the parts thereof removed.

The invention contemplates the provision of novel variable axial feeding means for the boring bar 24. An exemplary embodiment of this means, as best seen in Figures 9–13, is indicated by reference numeral 220 and preferably includes front 222 and rear 224 supporting plates connected together by a pair of laterally spaced rods 226 (Figure 10), the latter rods extending through an intermediate gear box 228 and being engaged at one end to nuts 227 bearing against plate 224 and at the other end being threadedly connected to plate 222. Box 228 includes a vertically elongated cup-shaped housing 230 having its open rearward end closed by a cover plate or lid 232 connected, as by bolts 234, to an outwardly extending lip or flange 236 on housing 230. The vertical side walls of housing 230 are thickened (as seen in Figure 10) and bored for slidably receiving the rods 226. Tightening screws, such as 238, may be provided for engaging rods 226 through the vertical side walls of housing 230 to prevent relative movement between the rods 226 and gear box 228.

The vertical web 240 of the housing 230 and the lid 232 preferably are provided with vertically spaced and aligned lower and upper bores. These bores 242, 244 on the housing 230 are coaxial with the corresponding bores 246, 248 on the lid 232 for a purpose to be apparent as the description proceeds. For assuring proper coaxial relation of these upper and lower bores, aligning pins 245 may be arranged at the top and bottom of the gear box 228 extending through cover plate 232 and housing 230 (see Figure 9).

The front 222 and rear 224 plates are respectively formed with central openings 250, 252 therein, coaxial with the lower bores 242, 246 (see Figure 10) in the housing web 240 and the lid 230. Opening 250 preferably is larger than opening 252, and a bearing sleeve 254 is secured in the latter opening as by a radial flange 256 thereon at one end thereof and a nut 258, threadedly connected to the other end thereof. The front plate 222 is formed with aligned upper and lower apertures 260, 262 (Figure 9) positioned for alignment with corresponding upper and lower tapped holes 264, 266 in bearing block 132 (Figure 4) so that upper and lower bolts 268 (Figure 9a) may be utilized to connect plate 222 to bearing block 132 through these aligned apertures 260, 262 and holes 264, 266 whereby the feeding means 220 will be disposed in operative position. Additional supporting structure (not shown) may be provided for retaining the feeding means 220 in its preferred generally horizontal position wherein it extends axially outwardly from the supporting means 110 to which it is attached.

A lead screw 270 preferably extends through bores 242, 246 of the housing 230 and cover plate 232 respectively, and is of a length approximately equal to the distance between plates 222, 224. The right hand end of this screw, as viewed in Figure 9 preferably is not threaded and is journalled in sleeve bearing 254 on rear plate 224. The opposite, or left hand, end of screw 270 is suitably drivingly connected to a generally cup-shaped, socket member 272 adapted to receive and be drivingly associated with the adjacent end of the boring bar 24, the latter being adapted to extend through aperture 250 in plate 224.

For securing screw 270 to member 272, a collar 274 may be provided at the inner end of member 272, embracing the adjacent end of screw 270 and abutting a radial shoulder 276 thereon. A threaded hole 278 preferably is formed in collar 274 into which a set screw (not shown) may be screwed for desired locking engagement with the adjacent end of screw 270.

The inner diameter of member 272 is approximately the same as or slightly larger than that of the boring bar 24, and the latter after being fitted into member 272 may be securely retained therein by a set screw (not shown) threaded into firm contact with the base of groove 25 of bar 24 through a suitably tapped hole 280 in member 272.

The screw 270, from a point adjacent shoulder 276 thereof to its opposite end, is formed with a longitudinal slot 282 for facilitating continuous driving connection between screw 270 and the gears arranged in box 228 during axial movement of screw 270 as will be presently described.

The gearing arranged in box 228 for variable or adjustable axial feed of screw 270 preferably comprises a reverted gear train (Figure 9) including a driver gear 284 drivingly connected coaxially to lead screw 270 through a key 286 and having a tub 288 journalled in a sleeve bearing 290 fitted into lower bore 246 of the cover plate 232. The gear train also includes the follower gear 291 having an outwardly extending hub 292 loosely embracing the screw 270. Hub 292 is journalled in a sleeve bearing 294 fitted in lower bore 242 of the housing 230 and extends outwardly of the housing a slight distance for driving engagement to a feed nut 296 threadedly connected to screw 270 and more fully explained hereinbelow. Another hub 298 preferably is provided for follower gear 291, extending oppositely from hub 292 and for a purpose set forth hereinafter.

The reverted gear train further includes gears 300, 302 meshing respectively with driver gear 284 and follower gear 290. These latter gears 300, 302 preferably are mounted for rotation on the axis of the aligned upper bores 244, 248 of the housing 230 and cover plate 232 respectively, by means of a tubular shaft 304 journalled in sleeve bearings 306, 308 respectively fitted in bores 244 and 248. Gear 300 is drivingly connected to shaft 304 through key 310 while gear 302 is journalled on this shaft. Two gears 312, 314 are journalled on shaft 304, intermediate the gears 300, 302 and meshing respectively with gears 316, 318 mounted on follower gear hub 298 and connected thereto by key 320. Suitable shims or abutting surfaces may be provided for preventing relative axial movement between the various gears, including those in the reverted gear train and the intermediate gears. The relative sizes of the various gears and the number of teeth thereon will be selected in accordance with the desired speed ratios between gears 284 and 291.

Tubular shaft 304 is provided with a longitudinal slot 322 therein extending approximately from gear 302 to gear 314 and adapted to be aligned normally with corresponding axial grooves 319, 321, 323 in the gears 302, 312, and 314, respectively.

A rod 324 (shown on enlarged scale in Figure 12) is slidably mounted within tubular shaft 304 to be rotatably driven thereby, as by engagement of square or other non-circular surfaces in transverse section on the rod 324 and in the shaft 304. Structure is provided on slidable rod 324 whereby rotation of driver gear 284 may be selectively transmitted either through gears 300, 302 of the gear train to follower gear 291 or through one of the two intermediate pairs of meshing gears 312, 316 or 314, 318 to the gear 291. This structure preferably includes a radially outwardly biased pin 326 arranged in a cavity in rod 324 adjacent one end thereof and retained therein by engagement of a small transverse pin 328 in a slot 330 of the pin. Springs 332 may be arranged in the cavity for urging the pin 326 outwardly. Pin 326 preferably has a convexly contoured outer end, normally extending through slot 322 of shaft 304 and facilitating insertion and withdrawal of pin 326 with respect to the desired groove 319, 321 or 323. Any convenient arrangement for shifting rod 324 axially within the shaft 304 to dispose pin 326 for engagement with the desired gear 302, 312, or 314 may be employed. An exemplary form includes a lever 328 (Figure 12) having a bifurcated lower end 330 fitted over a neck 332 of reduced area at one end of rod 324, the neck 332 being joined to an enlarged end 334 for preventing detachment of the lever. Lever 328 may be provided with a hole 336, intermediate its length for reception of a vertically elongated and flattened head 338 of upper bolt 234 attached to the gear box 228 (Figure 9). Bolt head 338 has a transverse aperture 340 therein, adapted to be aligned with corresponding transversely-spaced apertures 344 extending into the hole 336 in lever 328 whereby a bolt or rivet (not shown) may be utilized for pivotally connecting lever 328 to bolt head 338 by disposing the bolt head in the hole 336 of lever 328 with apertures 340, 344 disposed in alignment. The upper part (not shown) of lever 328 preferably is formed with a handle or other device for facilitating pivotal movement of the lever and consequent axial movement of rod 324.

In the normal Figure 12 position of lever 328 and rod 324, the pin 326 of rod 324 will be disposed in groove 319 of gear 302 whereby rotation of driver gear 284 by lead screw 270 through key 286 will be transmitted to follower gear 291 through gear 300 meshing therewith, key 310, shaft 304, rod 324, pin 326, and gear 302. To facilitate the establishment of this position of rod 324, a spring urged detent ball 346 is arranged in a blind radial hole 350 in rod 324 for removable partial insertion in a hole 352 in tubular shaft 304. It will be understood that other holes similar to 352 and axially spaced therefrom may be appropriately arranged in shaft 304 for partial insertion of ball detent 346 to establish and maintain the position of pin 326 in either of the grooves 321, 323 of gears 312, 314. In this latter case, rotation of driver gear 284 will then be transmitted to follower gear 291 through gear 300, shaft 304, rod 324, pin 326, gear 312 or 314 (depending on the position of rod 324), gear 316 or 318 meshing therewith, and key 320.

It will thus be seen that the speed ratio between driver gear 284 and follower gear 291 may be varied by appropriate positioning of rod 324. The purpose of this feature of the invention is to permit axial feeding speeds of the boring bar to be adjusted for coarser or finer cutting action. As previously stated, follower gear 291 is drivingly associated with nut 296, the latter being threadedly engaged to lead screw 270. Lead screw 270, being drivingly connected to the boring bar 24 at its cup member 272, will rotate with the boring bar and in turn it will drive the driver gear 284 of the reverted gear train through key 286, thereby producing rotation of feed nut 296 through the preselected gearing in the gear box. As is evident, such rotation of feed nut 296 will have a different magnitude than the rotation of lead screw 270 by reason of the speed change in going from driver to follower gears 284, 291 through the gearing in gear box 228, and consequently the difference in angular velocity of nut 296 and screw 270 will effect a driving axial movement of screw 270 and boring bar 24 (to the right in Figure 9, for example) because the axial position of gear box 228 and nut 296 is held stationary.

The feed nut 296 preferably includes an outer casing 354 having an annular boss 356 depending axially therefrom for driving engagement to hub 292 of gear 291 as by key 358 and/or a set screw (not shown) fixed in hole 360. Pivoted, split nut sections 362 (Figure 11) having internal threads are arranged in casing 354 for threaded association with lead screw 270. A cover plate 364 is suitably attached over the open end of casing 354, and has a large central aperture therein surrounding but not contacting screw 270. The split nut sections 362 preferably are mounted in position in casing 352 by a pivot pin 366 journalled in cover plate 364 and the base of the casing 354 and extending through aligned and spaced ends 368 of each section 362. A spring 370 extends between each nut section 362 and the casing 354 for urging the sections into desired engagement with the lead screw 270.

The ends of nut sections 362, opposite the ends 368, preferably are slightly spaced apart during working engagement of these sections with screw 270. Mating, semi-cylindrical holes 370 (Figure 11) are formed at these ends 372 and have radially inwardly tapering bottoms or bases. The purpose of this structure is to enable a key or similar tool to be conveniently inserted between these ends 372 for separating the sections 362, i.e., for disengaging these sections from screw 270 thereby facilitating assembly and disassembly of the lead screw 270 and nut 296.

Such a key 374 is illustrated on an enlarged scale in Figures 13 and 14. One end of the key is flattened for disposition between the flat longitudinal surfaces at ends 372 of nut sections 362, while the other end is shaped complementarily to the mated semi-cylindrical holes 370. Movement of this latter end of key 374 toward the right in Figure 9 will obviously effect the desired separation of nut sections 362 by reason of the camming or wedging action between the complementary, tapered surfaces of the key 374 and holes 370.

If desired, key 374 may be left in its non-separating position in the casing 354 during operation. A suitable opening or openings will be formed in cover plate 364 for the insertion or removal of key 374 from the feed nut 296. A handle 376 may be conveniently attached to key 374 for manual operation thereof.

It will be appreciated that the novel feeding means 220 for the boring bar 24 may be readily attached to and detached from one of the supporting means 110 and boring bar 24 without requiring any particular skill on the part of the operator. As indicated above, supporting structure may be provided for feeding means 220, and the axial feeding motion imparted to boring bar 24 thereby can be varied conveniently through the "gear shift" rod 324 and lever or handle 328, facilitating the desired complete boring operation. Any suitable lubricating system may be utilized for the gears in gear box 228 or any other parts of the apparatus.

Once the cylindrical crankshaft bearing surfaces 102 have been bored or rebored, as the case may be, I further contemplate the provision of novel apparatus for machining the various thrust or radial bearing surfaces adapted to be associated with the engine crankshaft. Numeral 380 in Figure 16 indicates such radial bearing surfaces formed, for example, at the opposed ends of one of the cylindrical bearing surfaces 102. As in the described embodiment of my novel positioning device 20, I prefer to utilize a positioning device 382 adapted to be engaged to a cylindrical surface (in this case one of the bearing surfaces 102) for accurately and precisely positioning a cutting tool 384.

The positioning device 382 includes threadedly connected inner 386 and outer 388 members, similar to members 76, 78 of the positioning device 20, as well as the radially reciprocable fingers 390 arranged in similar manner therewith as fingers 80 with members 76, 78.

Figures 15, 16, 17:
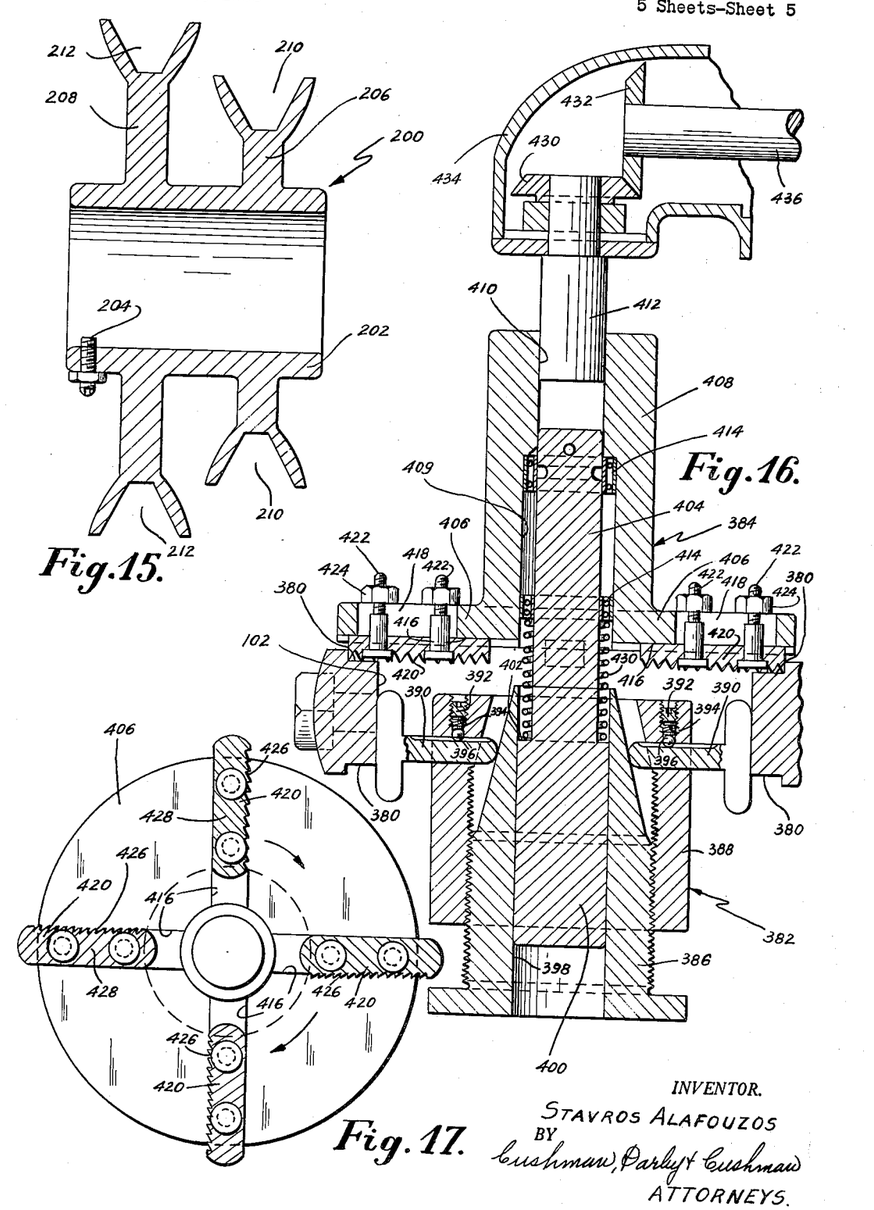
Figure 15 is a vertical sectional view of a pulley assembly for the boring bar.
Figure 16 is a fragmentary vertical sectional view of a preferred embodiment of an apparatus of the invention for machining the radial or thrust bearing surfaces of the engine bearings.
Figure 17 is a bottom plan view of the cutting tool used in the apparatus of Figure 16.

The set screw, spring and ball retainer in device 382 for fingers 390 are indicated by numerals 392, 394, and 396 respectively. Device 382 is operated the same way as device 20 when positioning the former in the bearing surface 102, with the fingers 390 thereof frictionally and tightly urged against surface 102. When the device 382 is in its preferred working position, as illustrated in Figure 16 which preferably will be after surface 102 has been bored, the axis of the bore 398 of inner member 386 will be coincident with the axis of the bore 102. A rod 400 preferably is press fitted or snugly inserted and retained by friction in bore 398, and includes a projecting upper portion 404 of smaller diameter than the portion fitted in bore 398, with a shoulder 402 formed between these portions. If desired, the diameter of bore 398 may be slightly smaller than that of the embraced portion of rod 400 or suitable stops or detents (not shown) may be provided for preventing relative axial movement between inner member 386 and rod 400.

The narrower projecting upper portion 404 of rod 400 is adapted to engage structure on tool 384 to properly position the latter for rotation on the axis of bore 102.

Cutting tool 384 preferably includes a disc-like base 406 having a centrally arranged, annular boss 408 extending upwardly therefrom. An axial bore 409 is formed in boss 408, extending throughout the height thereof and also through base 406. The top of this bore is defined by a small non-circular hole, such as square-shaped socket 410 for driving connection to a similarly contoured power take-off shaft 412 fitted therein. The lower part of bore 409 is larger than the upper part, and suitable axially spaced bearings 414 are disposed therein whereby the cutting tool 384 may be journalled on upper end of rod 400 in desired position. Any suitable structure and procedure may be employed for lubricating bearings 414.

The bottom surface of base 406 preferably is formed with a plurality of radial grooves 416 extending from the bore 409 to the outer periphery of the base. Base 406 further has an elongated slot 418 opening into each groove 416 and generally aligned therewith. A file-like cutting element 420 is radially adjustably arranged in each groove 416 and retained in desired radial position therein by bolts 422, extending through elements 420 and slots 418, and nuts 424 screwed thereon and tightened against base 406. Elements 420 may be constructed with vertical edge and horizontal cutting surfaces 426, 428 respectively and in this connection, the cross-hatching of the upper element 420 in Figure 17 does not indicate a cross-section thereof but indicates the oblique file-like cutting edges on the bottom horizontal surface thereof.

To avoid the danger of unduly scarring or injuring the radial bearing surface 380 by elements 420 when the tool 384 is placed in operative position, a coil spring 430 may be disposed between the lower bearing 414 in bore 309 and the shoulder 402 on the rod 400, for normally urging the elements 420 away from bearing surface 380.

After the tool 384 has been positioned by device 382, it may be drivingly connected to any suitable source of power (not shown) through the take-off shaft 412, meshing beveled gears 430, 432 arranged in housing 434, the former gear 430 coaxially connected to take-off shaft 412 and latter gear 432 being connected to a shaft 436, drivingly connected to the power source.

In operation of cutting tool 384, the cutting elements 420 will bear against radial surface 380 sufficiently to permit the desired machining thereof during rotation of the tool. By reason of the accurate positioning of tool 384 for rotation on the axis of bearing surface 102, assured by device 382, the cutting elements 420 may be preset so that the full and entire radial surface 380 will be machined thereby. Furthermore, the direction of rotation of the cutting tool 384, during operation, corresponds to the tightening direction for inner and outer threaded members 386, 388, respectively. That is to say, the cutting tool 384 and positioning device 382 are so constructed and arranged that there will be no danger of loosening the positioning device 382 from its locked disposition in the bearing 102, during operation of the tool.

It should be evident the invention will enable both cylindrical and radial bearing surfaces to be easily and accurately machined by relatively inexpensive and conveniently handled apparatus. The radial surfaces 380 normally will be machined after bearing surface 102 so that device 382 will be in proper position in bearing 102 for reception of the cutting tool 384.

It will thus be seen that the objects of this invention have been fully and effectively accomplished. It will be realized, however, that the foregoing specific embodiments have been shown and described only for the purpose of illustrating the principles of the invention and are subject to extensive change without departure from such principles. Therefore, this invention includes all modifications encompassed within the spirit and scope of the appended claims.

I claim:

1. In a device for machining engine crankshaft bearings, means for positioning and aligning a cutting tool for rotation on the theoretical axis of rotation of the crank shaft, said positioning means operating independently of the bearing surface or surfaces to be machined and including a first means engageable with a cylindrical surface of the engine and a second means disposed in generally vertical alignment with and operatively secured to said first means, said second means having a horizontal bore therethrough, a horizontally disposed cutting tool extending through said bore in said second means, bearing means adapted to be connected to said tool for permitting rotation thereof on the axis of rotation of the crankshaft, said first means including inner and outer members threadedly connected together, a plurality of radially movable elements carried by said outer member, and cam means on said inner member operable on inward relaitve axial movement between said members to move said elements radially outwardly into engagement with a cylindrical surface of the engine, and means adapted to be associated with said cutting tool for effecting a predetermined movement thereof.

2. The structure defined in claim 1 wherein the positioning and aligning means further includes a third means engageable with a flat reference surface of the engine, and adjustment means for varying the distance between said second and said third means.

3. The structure defined in claim 2 wherein the means associated with the cutting tool includes adjustable means for feeding the cutting tool axially relative to the engine bearings.

4. The structure defined in claim 3 wherein the feeding means is attached to one of the bearing means for the cutting tool and includes a lead screw drivingly connected to the cutting tool, an axially stationary feed nut engaging said lead screw, and variable drive means operatively connecting said feed screw to said feed nut for adjustable axial feed of said screw and said cutting tool.

5. A device adapted to position and align a boring bar for machining engine crankshaft bearings, said device comprising: positioning means adapted to be removably secured in an engine cylinder, said means including a boring bar engageable portion, an engine cylinder engageable portion and an engine engageable portion, means operatively connecting said boring bar engageable portion with said engine engageable portion, means associated with said last named portions defining a measurable distance corresponding to a predetermined engine dimension whereby said boring bar engageable portion will receive a boring bar so that its axis is in the same horizontal plane as the crankshaft axis and further will intersect the axis of the engine cylinder in which said positioning means is secured, and said positioning means operating independently of the bearing surface or surfaces to be machined, said boring bar engageable portion including a ring-like member and the engine engageable portion including a plate, the means associated with these portions including a removable insert for said ring member having a projecting horizontal surface and an opposed horizontal surface on said plate, and said inner and outer members threadedly connected together, a plurality of radially movable fingers projecting from said outer member and terminating at their inner ends within said latter member, and cam means on said inner member for radial projection of said fingers into contact with the engine cylinder walls.

6. The structure defined in claim 5 wherein means are provided for varying the measurable distance, said last-named means including a turnbuckle and oppositely threaded rods extending outwardly therefrom and respectively engaging said ring-like member and said plate; and the engine cylinder engageable portion including inner and outer sleeves threadedly connected together, said inner sleeve embracing said turnbuckle and said outer sleeve carrying a plurality of radially movable fingers projecting outwardly therefrom.

7. The structure defined in claim 6 wherein the inner sleeve includes means engageable with said fingers for increasing their radial projection while preventing inward radial movement thereof.

References Cited in the file of this patent

UNITED STATES PATENTS

| | | |
|---|---|---|
| 1,220,399 | Cowell | Mar. 27, 1917 |
| 1,417,278 | Peters | May 22, 1922 |
| 1,585,026 | Green | May 18, 1926 |
| 1,608,659 | Jenson | Nov. 30, 1926 |
| 1,611,570 | Wadell | Dec. 21, 1926 |
| 1,680,300 | Mallory | Aug. 14, 1928 |
| 1,698,862 | Wadell | Jan. 15, 1929 |
| 1,797,615 | Magin | Mar. 24, 1931 |
| 1,814,078 | Cole | July 14, 1931 |
| 1,836,078 | Litter | Dec. 15, 1931 |
| 1,909,347 | Hall | May 16, 1933 |
| 1,955,362 | Floss | Apr. 17, 1934 |
| 2,034,488 | Rottler | Mar. 17, 1936 |
| 2,393,195 | Sapper | Jan. 15, 1946 |
| 2,542,938 | Morris | Feb. 20, 1951 |
| 2,592,409 | Frankland | Apr. 8, 1952 |
| 2,784,617 | Bretz | Mar. 12, 1957 |